United States Patent [19]

Grimsrud

[11] Patent Number: 5,726,913
[45] Date of Patent: Mar. 10, 1998

[54] METHOD AND APPARATUS FOR ANALYZING INTERACTIONS BETWEEN WORKLOADS AND LOCALITY DEPENDENT SUBSYSTEMS

[75] Inventor: Knut Grimsrud, Aloha, Oreg.

[73] Assignee: Intel Corporation, Santa Clara, Calif.

[21] Appl. No.: 547,603

[22] Filed: Oct. 24, 1995

[51] Int. Cl.$^6$ .................................................. G06F 9/455
[52] U.S. Cl. ................. 364/551.01; 395/184.01; 395/183.13; 371/22.1
[58] Field of Search .................... 364/551.01, 550; 395/184.01, 183.13; 371/22.1

[56] References Cited

U.S. PATENT DOCUMENTS

| | | | |
|---|---|---|---|
| 5,446,876 | 8/1995 | Levine et al. | 395/184.01 |
| 5,452,440 | 9/1995 | Salsburg | 395/463 |
| 5,574,937 | 11/1996 | Narain | 395/800 |

OTHER PUBLICATIONS

Grimsrud et al., "BACH: a hardware monitor for tracing microprocessor–based systems", Oct. 1993.

Grimsrud, K., Quantifying Locality, Ph.D. Dissertation, Brigham Young University, 1993.

*Primary Examiner*—James P. Trammell
*Assistant Examiner*—Patrick Assouad
*Attorney, Agent, or Firm*—Blakely, Sokoloff, Taylor & Zafman

[57] ABSTRACT

A locality characteristic generator and a response surface characteristic generator are provided either jointly or separately to one or more computer systems for generating locality characteristic data for workloads, and response surface characteristic data for locality dependent subsystem, independent of each other, which in turn are used to generate independent locality and response surface characteristic profiles. Each locality characteristic profile reflects the probability that the first occurrence of an access to a location with a stride of size s from the current location takes place between the reference distance of d/2 to d from the current reference. Each response surface characteristic profile reflects what the expected response time will be if the first occurrence of an access to a location having a stride of size s from the current location takes place between the reference distance of d/2 to d from the current reference. Accordingly, any one of the locality characteristic profiles can be used in conjunction with any one of the independent response surface characteristic profiles to analyze the interaction between the particular combination of workload and locality dependent subsystem. Alternatively, the generated locality and response characteristic data can be used to generate performance indices for various combinations of workloads and locality dependent subsystems.

40 Claims, 18 Drawing Sheets

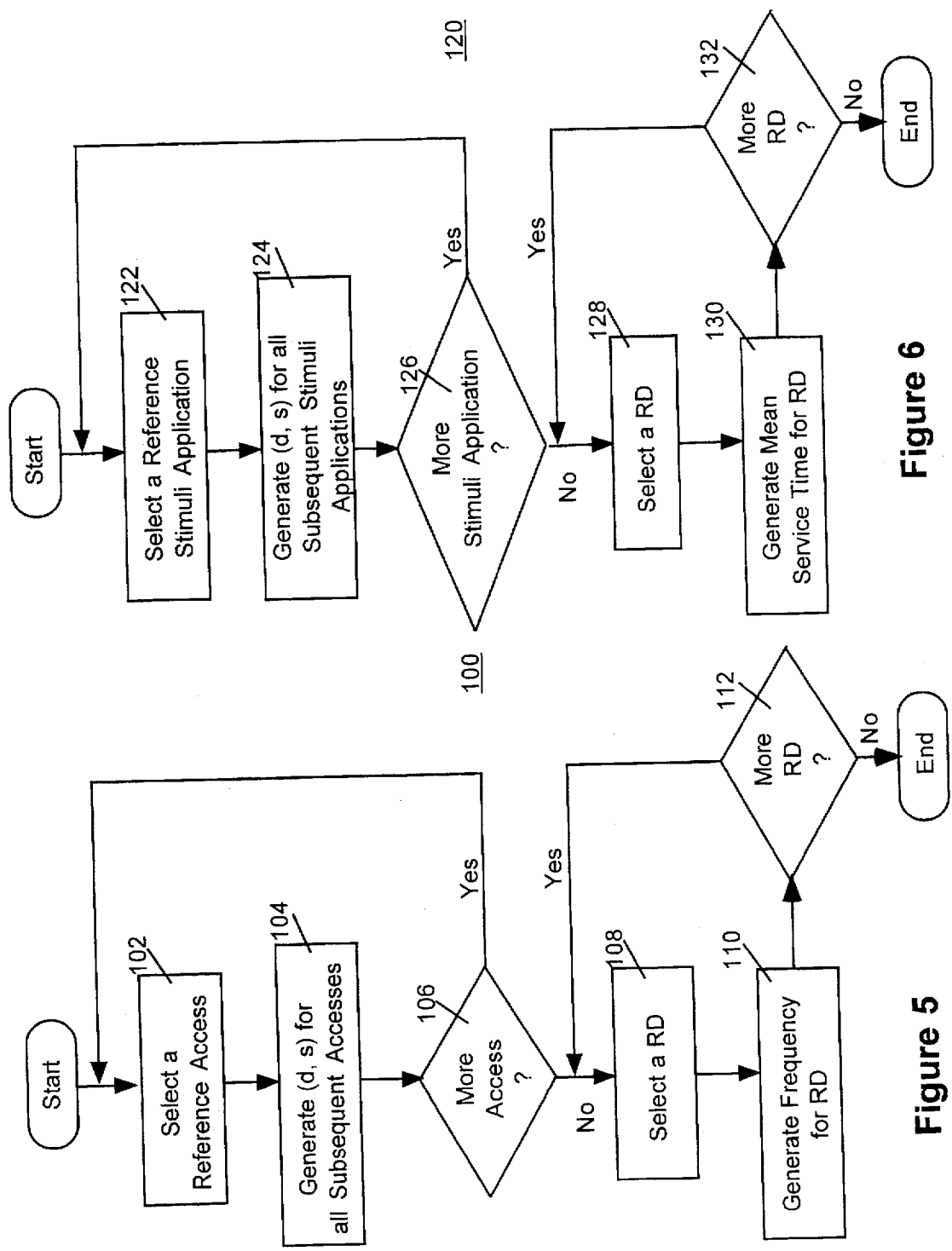

$t_0=0$:
    d 1, s 1
    d 2, s 2
    d 3, s 3
    d 4, *    (not first occurrence of 5)
    d 5, *    (not first occurrence of 6)
    d 6, s 5
    d 7, s 6

$t_0=1$:
    d 1, s 1
    d 2, s 2
    d 3, s 0
    d 4, *    (not first occurrence of 6)
    d 5, s 4
    d 6, s 5

$t_0=0$:
- d 1, s 1 = 0.2
- d 2, s 2 = 0.2
- d 3, s 3 = 0.3
- d 4, *      (not first occurrence of 5)
- d 5, *      (not first occurrence of 6)
- d 6, s 5 = 1.5
- d 7, s 6 = 0.2

$t_0=1$:
- d 1, s 1 = 0.2ms
- d 2, s 2 = 0.3ms
- d 3, s 0 = 1.0ms
- d 4, *      (not first occurrence of 6)
- d 5, s 4 = 1.5ms
- d 6, s 5 = 0.2ms $t_0=2$:
- d 1, s 1 = 0.3ms
- d 2, s -1 = 1.0ms
- d 3, s 0 = 0.3ms
- d 4, s 3 = 1.5ms
- d 5, s 4 = 0.2ms $t_0=3$:
- d 1, s -2 = 1.0ms
- d 2, s -1 = 0.3ms
- d 3, s 2 = 1.5ms
- d 4, s 3 = 0.2ms $t_0=4$:
- d 1, s 1 = 0.3ms
- d 2, s 4 = 1.5ms
- d 3, s 5 = 0.2ms $t_0=5$:
- d 1, s 3 = 1.5ms
- d 2, s 4 = 0.2ms $t_0=6$:
- d 1, s 1 = 0.2ms

Figure 10

| Distance | Stride -2 | -1 | 0 | 1 | 2 | 3 | 4 | 5 | 6 |
|---|---|---|---|---|---|---|---|---|---|
| 1 | 1.0ms/1 | | | 1.2ms/5 | | 1.5ms/1 | | | |
| 2 | | 1.3ms/2 | | | 0.5ms/2 | | 1.7ms/2 | | |
| 3-4 | | | 1.3ms/2 | | 1.5ms/1 | 2.0ms/3 | | 0.2ms/1 | |
| 5-8 | | | | | | | 1.7ms/2 | 1.7ms/2 | 0.2ms/1 |

Figure 11a

| Distance | Stride -2 | -1 | 0 | 1 | 2 | 3-4 | 5-8 |
|---|---|---|---|---|---|---|---|
| 1 | 1.0ms/1 | | | 1.2ms/5 | | 1.5ms/1 | |
| 2 | | 1.3ms/2 | | | 0.5ms/2 | 1.7ms/2 | |
| 3-4 | | | 1.3ms/2 | | 1.5ms/1 | 2.0ms/3 | 0.2ms/1 |
| 5-8 | | | | | | 1.7ms/2 | 1.9ms/3 |

Figure 11b

METHOD AND APPARATUS FOR ANALYZING INTERACTIONS BETWEEN WORKLOADS AND LOCALITY DEPENDENT SUBSYSTEMS

BACKGROUND OF THE INVENTION

1. Field of the Invention

The present invention relates to the field of computer system performance. More specifically, the present invention relates to the analysis of interactions between workloads and locality dependent subsystems.

2. Background Information

In the field of computer systems, individual component and/or system performance has always been a subject of great interest, in particular, in the area of locality dependent subsystems[1]. Typically, under the prior art, the performance burdens of various workloads and/or the responsiveness of various locality dependent subsystems are evaluated directly by analyzing the interactions between the workloads and the locality dependent subsystems. Each of the workloads would be executed against each of the locality dependent subsystems, and the performance data of each execution would be gathered and analyzed. In other words, to evaluate the interactions between 12 workloads and 3 locality dependent subsystems, 36 separate runs, data gathering, and analyses must be performed. Therefore, the time and computing resources required to examine the various combinations can quickly become unmanageable. Thus, a more efficient and effective approach to analyzing interactions between workloads and locality dependent subsystems is desirable. As will be disclosed in more detail below, the present invention achieves these and other desired results.

[1] For the purpose of this application, locality dependent subsystems include cache subsystems, instruction fetch units and the like.

SUMMARY OF THE INVENTION

A locality characteristic generator and a response surface characteristic generator are provided either jointly or separately to one or more computer systems. The locality characteristic generator is used to generate locality characteristic data for workloads, whereas the response surface characteristic generator is used to generate response surface characteristic data for locality dependent subsystems.

In one embodiment, the generated characteristic data are provided to a conventional plotter to correspondingly generate independent locality and response surface characteristic profiles for workload and locality dependent subsystem interaction analyses.

Each locality characteristic profile reflects the probability that the first occurrence of an access to a location with a stride of size s from the current location occurs between the reference distance of d/2 to d from the current reference. Similarly, each response surface characteristic profile reflects what the expected response time will be if the first occurrence of an access to a location having a stride of size s from the current location takes place between the reference distance of d/2 to d from the current reference.

The locality characteristic generator generates the locality characteristic data for various workloads based on captured execution trace records of the workloads comprising addresses of accesses made during execution. The response surface characteristic generator generates the response characteristic data for various locality dependent subsystems based on independently captured response records comprising target addresses of the stimuli applied and response times to the stimuli.

Accordingly, any one of the locality characteristic profiles can be used in conjunction with any one of the independent response surface characteristic profiles to analyze the interaction between the particular combination of workload and locality dependent subsystem. An exemplary approach to analyzing the interaction is through visual inspection of the response surface characteristic profile for the region(s) of (d,s) values where the locality characteristic profile indicates a high propensity for activities.

In an alternate embodiment, the generated locality and response time characteristic data are combined together in a "weighted" manner to generate expected performance indices for various workload and locality dependent subsystem combinations.

BRIEF DESCRIPTION OF DRAWINGS

The present invention will be described by way of exemplary embodiments, but not limitations, illustrated in the accompanying drawings in which like references denote similar elements, and in which:

FIGS. 5–6 illustrate one embodiment each for the operational flow of the locality characteristic generator and the response surface characteristic generator of FIG. 2;

FIGS. 8 and 9a–9b illustrate an exemplary generation of locality characteristic data;

FIGS. 10 and 11a–11b illustrate an exemplary generation of response characteristic data;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as they are necessarily order dependent in their performance.

Figure 1:
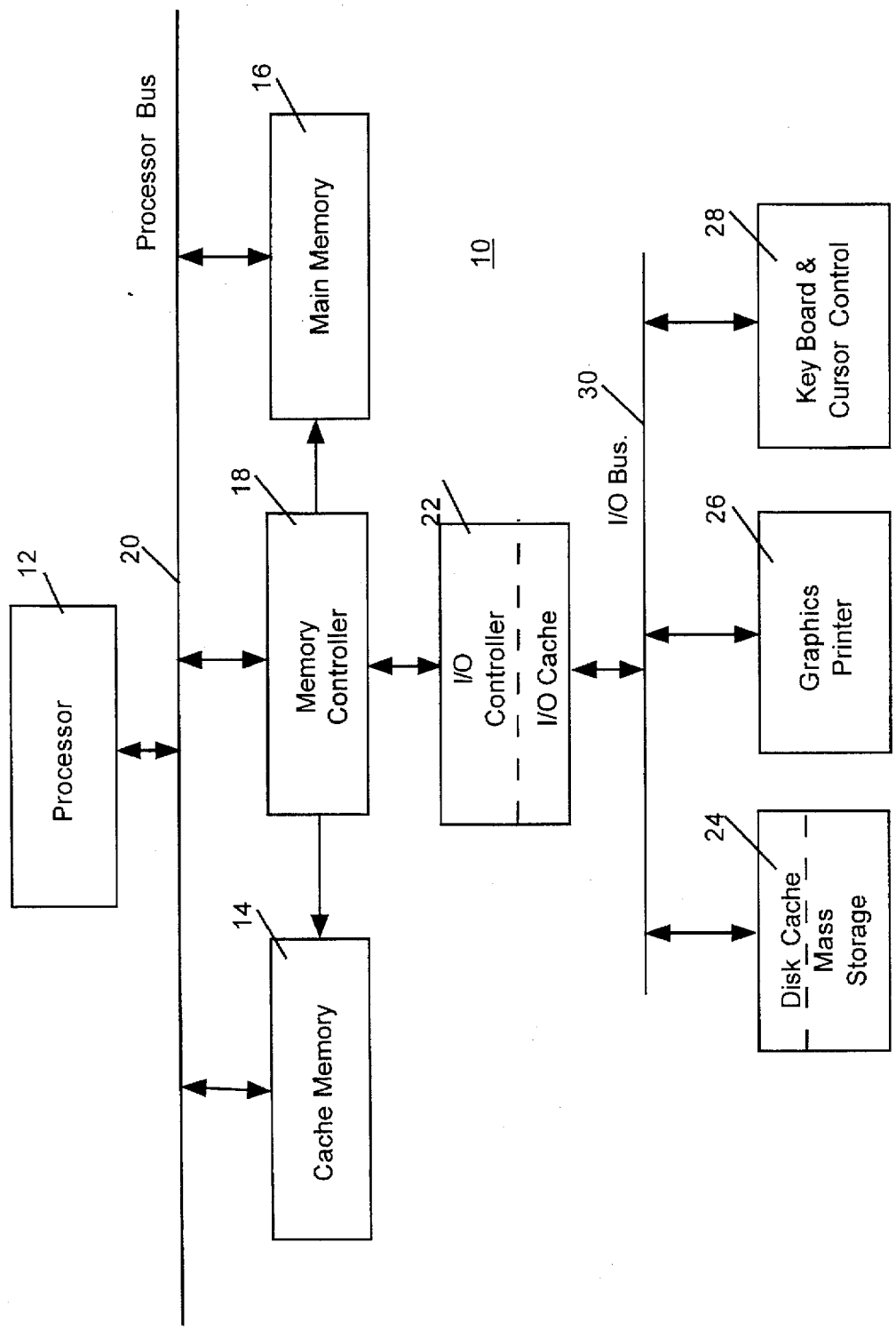
FIG. 1 illustrates an exemplary computer system incorporating the teachings of the present invention.

Referring now to FIG. 1, a block diagram illustrating an exemplary computer system 10 incorporating the teachings of the present invention is shown. Exemplary computer system 10 includes processor 12, cache memory 14, main memory 16, memory controller 18 and processor bus 20 coupled to each other as shown. Additionally, computer system 10 includes I/O controller 22 mass storage 24, graphics plotter 26, keyboard and cursor control 28, and I/O bus 30 coupled to each other and the above enumerated elements as shown. In one embodiment, I/O controller 22 includes I/O cache and mass storage 24 includes disk cache. Except for the manners they are used, to be described more fully below, these elements perform their respective conventional functions known in the art, and may be implemented in any one of a number of techniques known in the art. In fact, exemplary computer system 10 is intended to represent a broad category of computer systems including but not limited to computer systems based on Intel® Architecture Processors.

Figure 2:
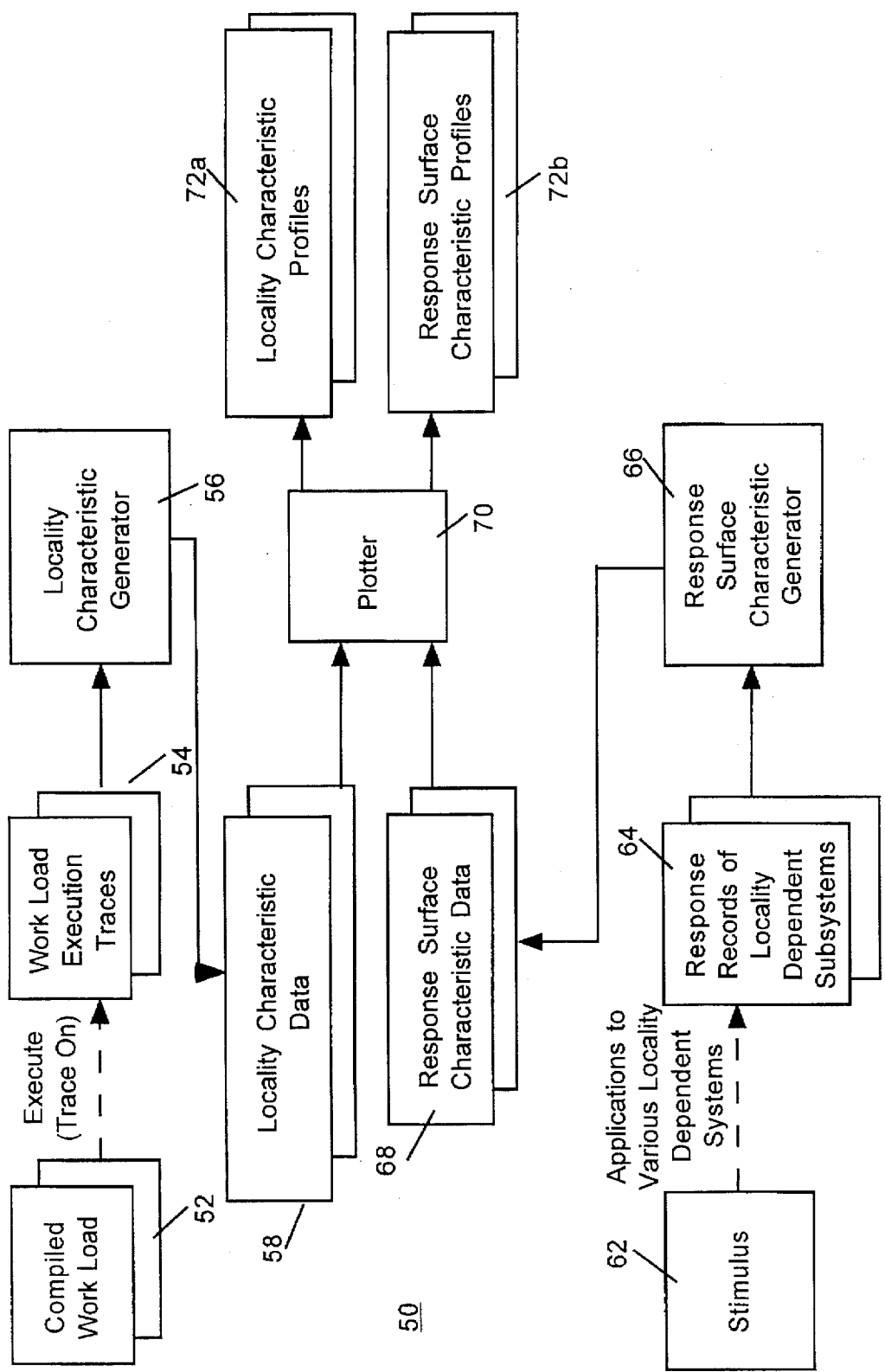
FIG. 2 illustrates of the essential data and software elements incorporated in the exemplary computer system of FIG. 1.

FIG. 2 illustrates the key software and data elements of exemplary computer system 10. In accordance to the present invention, exemplary computer system 10 is provided with locality characteristic generator 56 and response surface characteristic generator 66. Locality characteristic generator 56 is used to generate locality characteristic data 58 for workloads, whereas the response surface characteristic generator 66 is used to generate response surface characteristic data 68 for locality dependent subsystems. The generated characteristic data 58 and 68 are in turn provided to a conventional plotter 70 to correspondingly generate independent locality and response surface characteristic profiles 72a and 72b for workload and locality dependent subsystem interaction analyses.

As will be described in more detail below, each locality characteristic profile 72a reflects for a workload the probability that the first occurrence of an access to a location with a stride of size s from the current location occurs between the reference distance of d/2 to d from the current reference. Similarly, each response surface characteristic profile 72b reflects for a locality dependent subsystem what the expected response time will be if the first occurrence of an access to a location having a stride of size s from the current location takes place between the reference distance of d/2 to d from the current reference.

Locality characteristic generator 56 generates locality characteristic data 58 for the various workloads 52 based on captured execution trace records 54 of the workloads 52. Response surface characteristic generator 66 generates the response characteristic data 68 for the various locality dependent subsystems (not shown) based on independently captured response records 64.

Accordingly, as will be readily apparent to one skilled in the art from the description to follow, any one of the locality characteristic profiles 72a can be used in conjunction with any one of the independent response surface characteristic profiles 72b to analyze the interaction between the particular combination of workload and locality dependent subsystem.

Before we proceed to described generators 56 and 66, including the input and output data 54, 58, 64 and 68, it should be noted that while for ease of explanation, the two generators 56 and 66 are being described as being provided to the same computer system, the present invention may be practiced with the two generators 56 and 66 being provided jointly to the same or separately to different computer systems. Likewise, the collection of the workload trace data 54 and the collection of the response data 64 may be performed on the same system or different computer systems from each other and from the generators 56 and 66.

Figure 3:
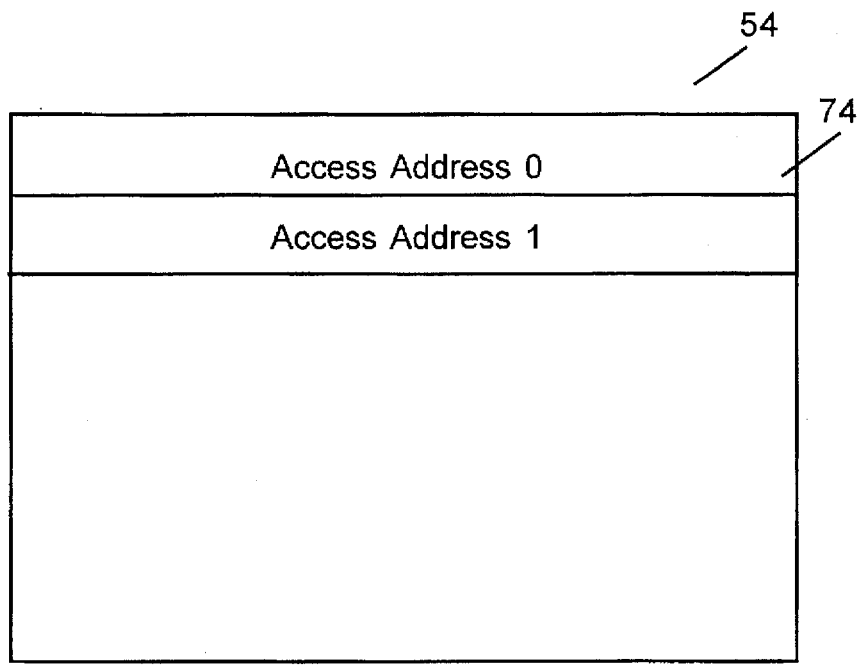
FIGS. 3–4 illustrate one embodiment each for the trace records and response data of FIG. 2.
Figure 4:
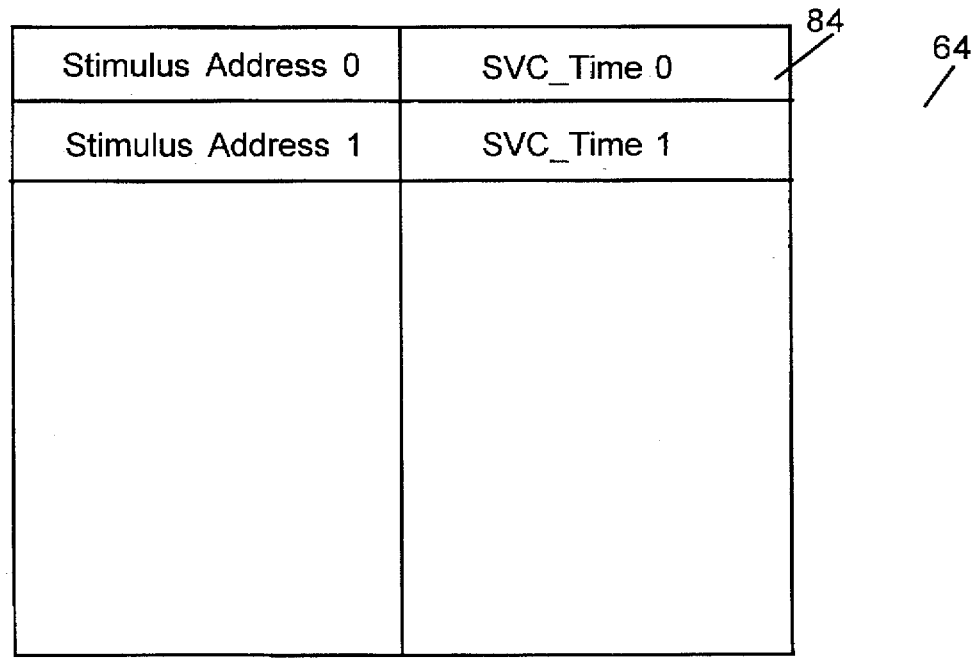

FIGS. 3 and 4 illustrate one embodiment each of workload trace data 54 and response data 64. As shown, each collection of workload trace data 54 comprises a number of trace records 74 having target addresses of the various accesses made by a workload during a representative execution. Similarly, each collection of response data 64 comprises a number of response records 84 having target addresses of various stimuli applied to a locality dependent subsystem, and the corresponding response times to the stimuli. In one embodiment, the target addresses of the various stimuli are randomly generated. The collection of these data are well within the ability of those skilled in the art, accordingly, it will not be further described.

FIGS. 5 and 6 illustrate one embodiment each of the operation flow of the two generators 56 and 66. As shown in FIG. 5, locality characteristic generator 56 first selects a reference access, step 102, and generates a number of reference distances (d) and corresponding stride sizes (s) based on the reference and location displacements of the subsequent accesses from the selected reference access, step 104. In one embodiment, the (d,s) value is generated only if the subsequent access is the first subsequent access to the particular address. Locality characteristic generator 56 repeats steps 102–104 for each access. In one embodiment, the reference access is selected sequentially, and the generation of all (d,s) pairs is also performed sequentially, to be described more fully below.

Upon computing all (d,s) pairs for each accessed location, locality characteristic generator 56 then selects a range of d values (rd), step 108, and computes the frequencies, i.e. the probabilities, for all s values for the particular rd, step 110. Locality characteristic generator 56 repeats steps 108–110 until all d values have been covered. In one embodiment, rd is selected systematically based on non-overlapping ranges of d/2 and d values, i.e. 1, 2, 3–4, 5–8 and so forth. The frequencies are determined by dividing the number of occurrences of the various s values of each rd by the total number of occurrences of the rd, to be described more fully below. In an alternate embodiment, the frequencies or probabilities are calculated for each $\log_2 s$ value instead of each s value.

Similarly, as shown in FIG. 6, response surface characteristic generator 66 first selects a reference applied stimulus, step 122, and generates a number of reference distances (d) and corresponding stride sizes (s) based on the reference and location displacements of the subsequent applied stimulus from the selected reference applied stimulus, step 124. In one embodiment, the (d,s) value is generated only if the subsequent applied stimulus is the first subsequent applied stimulus to the particular address. The associated response times are maintained for each pair of (d,s) values. Response surface characteristic generator 66 repeats steps 122–124 for all applied stimuli. In one embodiment, the reference applied stimulus is selected sequentially, and the generation of all (d,s) pairs and their associated response times is also performed sequentially, to be described more fully below.

Upon computing all (d,s) pairs for each target location, response surface characteristic generator 66 then selects a range of d values (rd), step 108, and computes the average response time for all s values for the selected rd, step 130. Response surface characteristic generator 66 repeats steps 128–130 until all d values have been covered. In one embodiment, rd is selected systematically based on non-overlapping ranges of d/2 and d values, i.e. 1, 2, 3–4, 5–8, and so forth. The response times are determined by averaging the associated response times of the applicable (d,s) pairs for each s value within each rd, also to be described more fully below. In an alternate embodiment, the average response time are calculated for each $\log_2 s$ value instead each s value.

Figure 7:
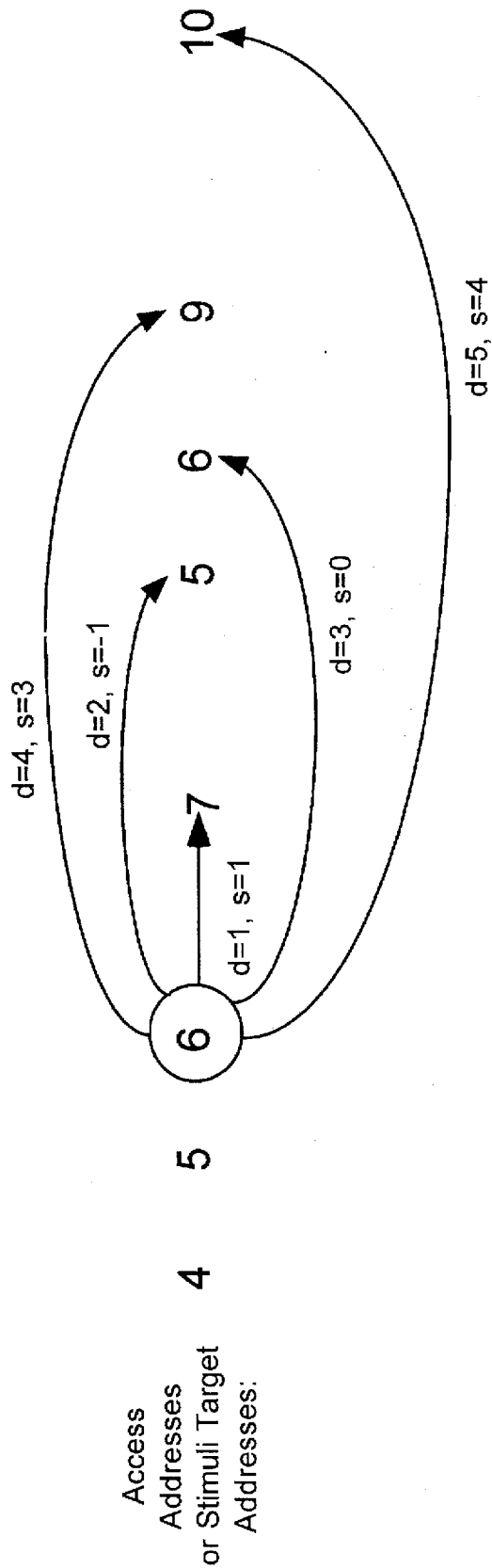
FIG. 7 illustrates how reference distances and stride sizes are calculated by the two generators.

FIG. 7 illustrates how reference distances (d) and stride values (s) are calculated for accesses and stimulus applications. Shown is an exemplary sequence of seven addresses, 4, 5, 6, 7, 5, 6, 9, 10. These addresses could be access addresses captured during exemplary execution of a workload, or target addresses of stimuli captured during application of stimuli to a locality dependent subsystem. (Note that the address sequences for workload accesses and stimulus applications are typically not the same, since representative execution of workloads and stimulating locality dependent subsystems are performed separately and independently. However, one "common" address sequence is used here for ease of explanation.)

Consider the exemplary address "6", subsequent to the hypothetical access or applied stimulus at address "6", there are five subsequent accesses/applied stimuli (hereinafter "events"). The addresses of these five subsequent events are 7, 5, 6, 9, 10. Thus, the reference distances d of the five subsequent events are 1, 2, 3, 4, 5 respectively. For these reference distances d, the stride sizes s are 1 (7-6), −1(5-6), 0(6—6), 3(9-6) and 4(10-6) respectively. In other words, an event having a stride size s of 1 from the current location occurred within 1 reference distance d from the current reference, an event having a stride size s of −1 from the current location occurred within 2 reference distance d from the current reference, and so forth.

Figure 9A:
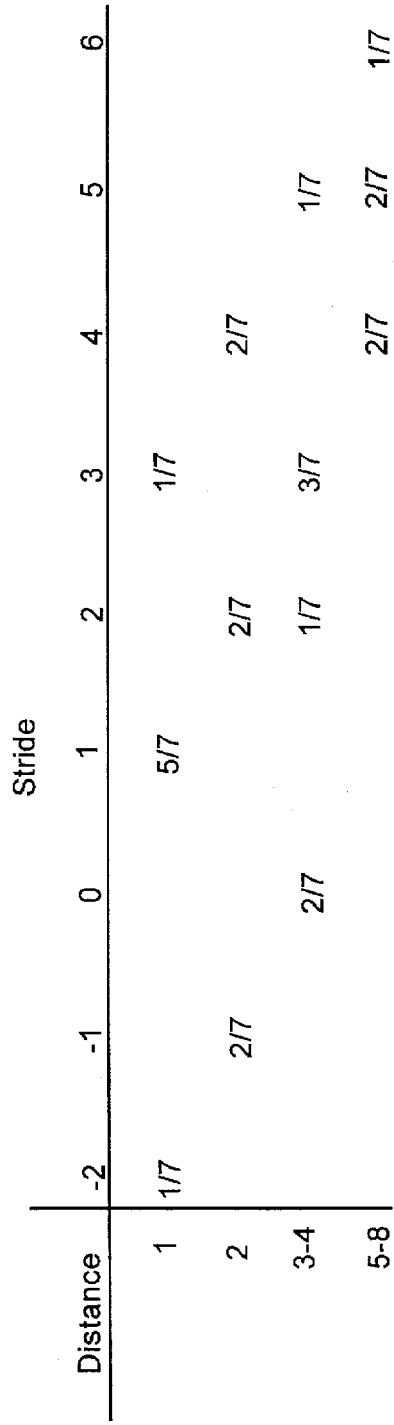
Figure 9B:
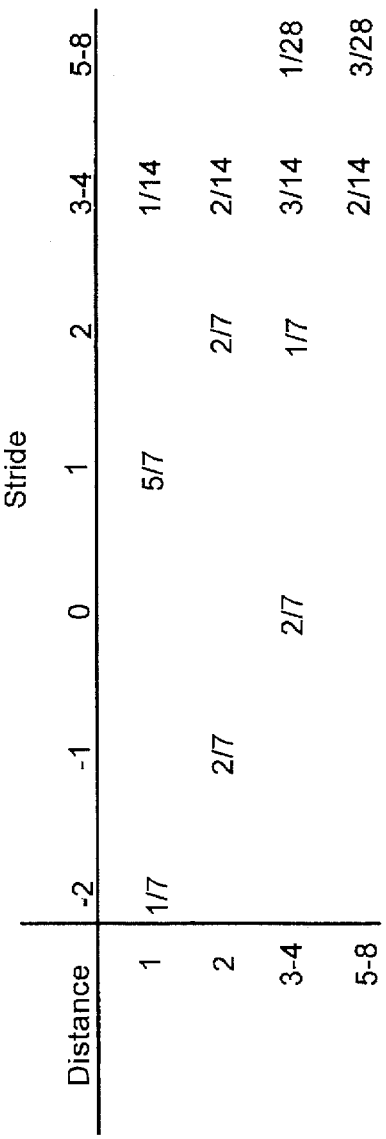

FIGS. 8, and 9a–9b illustrate an exemplary generation of (d,s) values and the frequencies of interest for an exemplary workload. The exemplary generation is based on the exemplary address sequence of FIG. 7. As shown, in FIG. 8, locality characteristic generator 56 first selects access to address "4" as the reference access, and computes a number of (d,s) values based on the reference and location displacements of the subsequent accesses. For the illustrated embodiment, (d,s) values are computed only if the subsequent access is the first subsequent access to the particular addresses. Thus, for the access to address "4", five (d,s) pairs are computed, i.e. (1,1), (2,2), (3,3), (6,5) and (7,6). The (d,s) values for the second subsequent accesses to address "5" and "6" are not computed, since they are not the first subsequent access to the particular addresses. Similarly, for the second access (to address "5"), the (d,s) values of (1,1), (2,2), (3,0), (5,4) and (6,5) are generated. For the third access (to address "6"), the (d,s) values of (1,1), (2,−1), (3,0), (4,3) and (5,4) are generated, and so forth.

As shown in FIG. 9, upon computing the (d,s) values, locality characteristic generator 54 selects various rds, and for each rd, computes the frequencies for the various s values for the particular rd. For the illustrated embodiment, the rd are selected using non-overlapping ranges of d/2 to d values, i.e. 1, 2, 3–4, 5–8 etc. Thus, for rd =1, since there were 1 occurrence for s=−2, 5 occurrences for s=1, and 1 occurrence for s=3, the frequencies of 1/7 (for s=−2), 5/7 (for s=1), and 1/7 (for s=3) were computed. Similarly, the frequencies of 2/7 (for s=−1), 2/7 (for s=2) and 2/7 (for s=4) were computed for rd=2. The frequencies of 2/7 (for s=0), 1/7 (for s=2), 3/7 (for s=3) and 1/7 (for s=5) were computed for rd=3–4, and so forth.

FIG. 9b illustrates an alternate embodiment, wherein for each rd value, the frequencies were computed for each $\log_2 s$ value instead each s value. For example, for rd=1, the frequencies were determined to be 1/7 (for s=−2), 5/7 (for s=1), and 1/14 (for s=3–4). The frequency is 1/14 for s=3–4 because 1/7 was determined for s=3 and 0/7 was determined for s=4.

FIGS. 10, and 11a–11b illustrate an exemplary generation of (d,s) values and the average response time of interest for an exemplary workload. The exemplary generation is based on the exemplary address sequence of FIG. 7, with the additional assumption that the response times for the various exemplary stimulus applications are 0.3 ms, 0.2 ms, 0.2 ms, 0.3 ms, 1.0 ms, 0.3 ms, 1.5 ms and 0.2 ms respectively. As shown in FIG. 10, response surface characteristic generator 66 first selects applied stimulus to address "4" as the reference applied stimulus, and computes a number of (d,s) values based on the reference and location displacements of the subsequently applied stimulus. For the illustrated embodiment, (d,s) values are computed only if the subsequently applied stimulus is the first subsequent stimulus application to the particular addresses. Thus, for the applied stimulus to address "4", five (d,s) pairs are computed, i.e. (1,1), (2,2), (3,3), (6,5) and (7,6). The (d,s) values for the second subsequently applied stimuli to address "5" and "6" are not computed, since they are not the first subsequently applied stimuli to the particular addresses. The associated response times 0.2 ms, 0.2 ms, 0.3 ms, 1.5 ms, and 0.2 ms are maintained for the computed (d,s) pairs. Similarly, for the second applied stimulus (to address "5"), the (d,s) values of (1,1), (2,2), (3,0), (5,4) and (6,5) are generated, and the corresponding response times of 0.2 ms, 0.3 ms, 1.0 ms, 1.5 ms and 0.2 ms are maintained. For the third applied stimulus (to address "6"), the (d,s) values of (1,1), (2,−1), (3,0), (4,3) and (5,4) are generated and the response times of 0.3 ms, 1.0 ms, 0.3 ms, 1.5 ms, and 0.2 ms are maintained, and so forth.

As shown in FIG. 11a, upon computing the (d,s) values, response surface characteristic generator 54 selects various rds, and for each rd, computes the average response time for the various s values for the particular rd. For the illustrated embodiment, the rd are selected using non-overlapping ranges of d/2 to d values, i.e. 1, 2, 3–4, 5–8 etc. Thus, for rd=1, since the response times for s=−2 was 1.0 ms, for s=1 were 0.2, 0.2, 0.3, 0.3 and 0.2 ms, and for s=3 was 1.5 ms, the average response times are 0.2 ms (for s=−2), 1.2 ms/5 or 0.24 ms (for s=1), and 1.5 ms (for s=3) were computed. Similarly, for rd=2, the average response times of 1.3ms/2 or 0.65 (for s=−1), 0.5ms/2 or 0.25ms (for s=2) and 1.7ms/2 or 0.85 ms (for s=4) were computed. For rd=3–4, the average response times of 1.3 ms/2 or 0.65 ms (for s=0), 1.5 ms (for s=2), 2.0 ms/3 or 0.67 (for s=3) and 0.2 ms (for s=5) were computed, and so forth.

FIG. 10b illustrates an alternate embodiment, wherein for each rd value, the average response times were computed for each $\log_2 s$ value instead each s value. For example, for rd=1, the average response times were determined to be 1.0 ms (for s=−2), 1.2 ms/5 or 0.24 ms (for s=1), and 1.5 ms (for s=3–4).

Figure 12A:
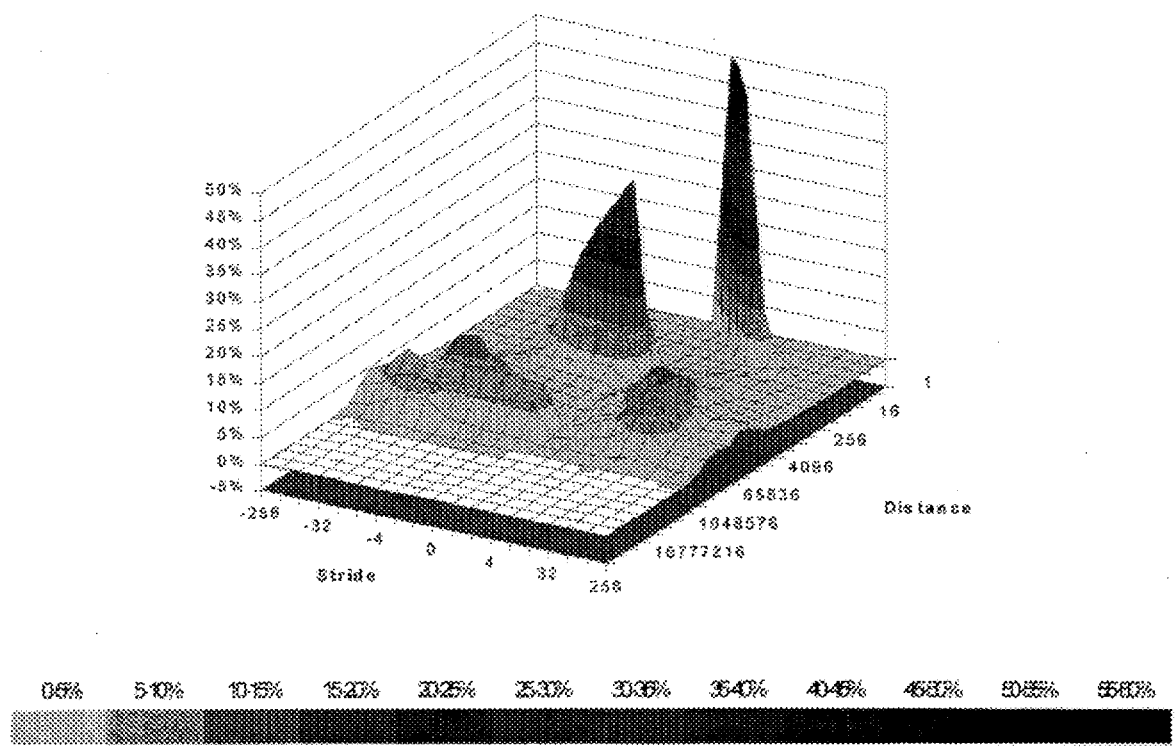
FIGS. 12a–12b and 13a–13b illustrate two exemplary locality characteristic profiles.
Figure 12B:
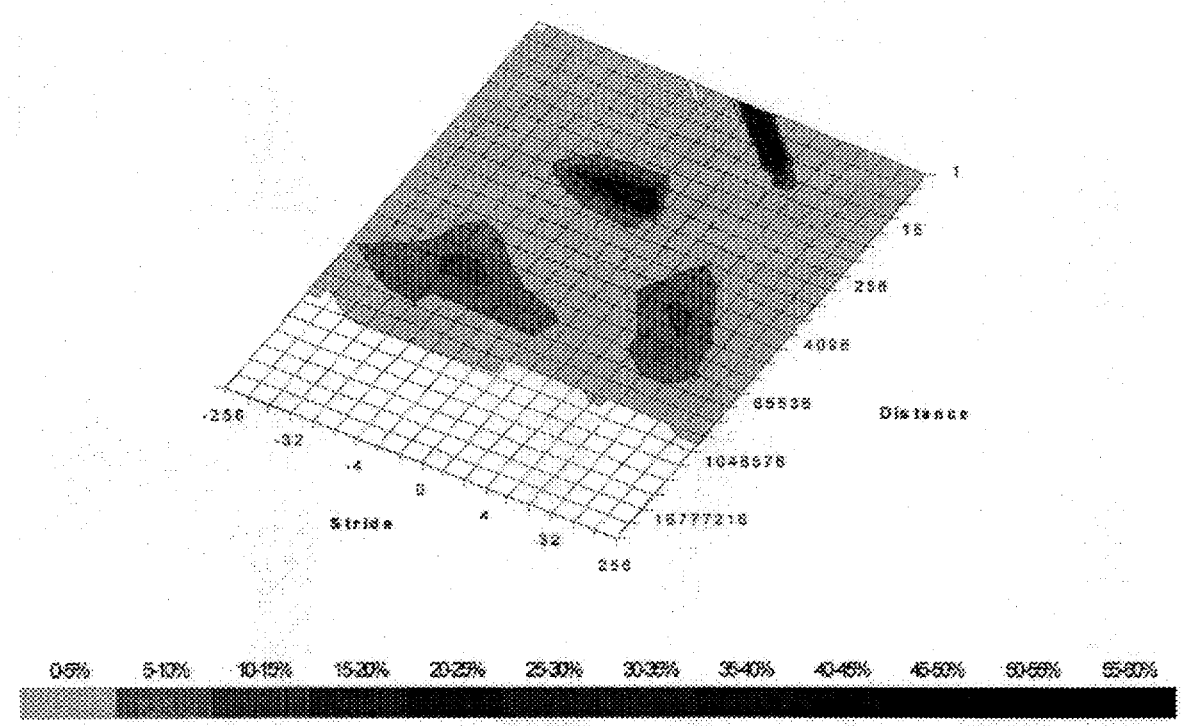
Figure 13A:
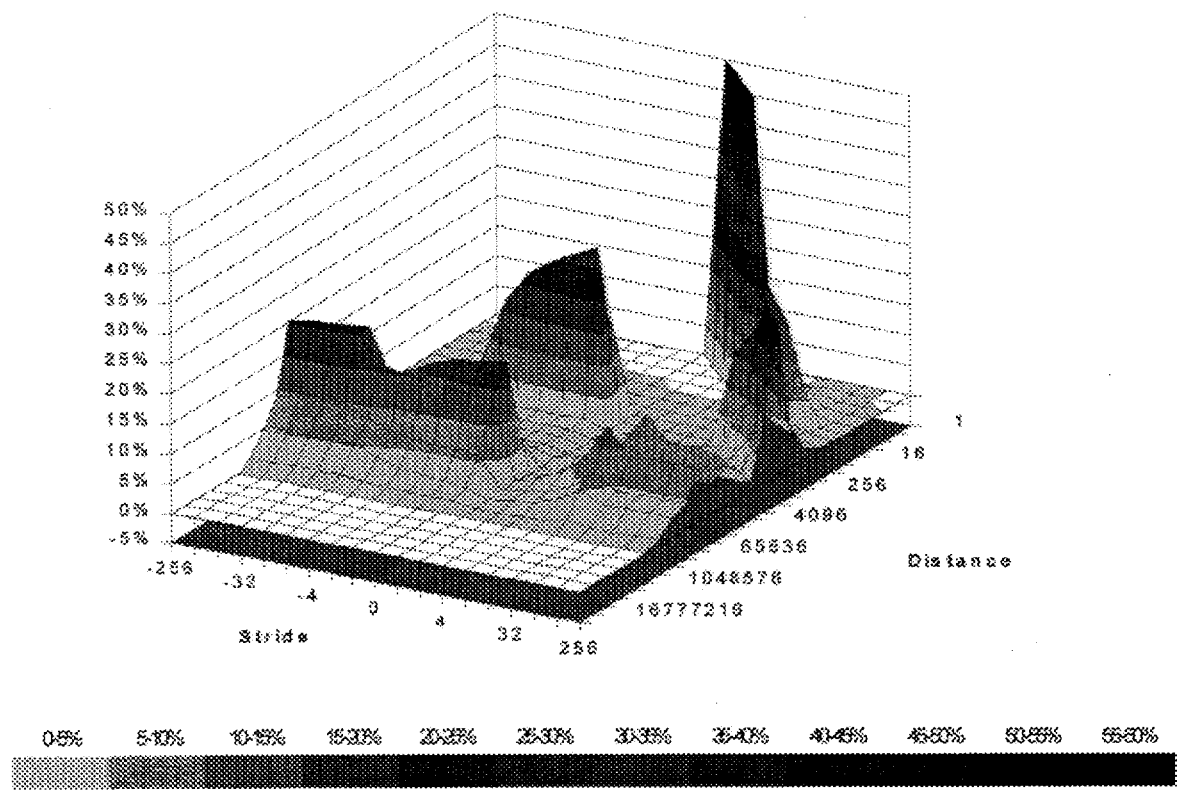
Figure 13B:
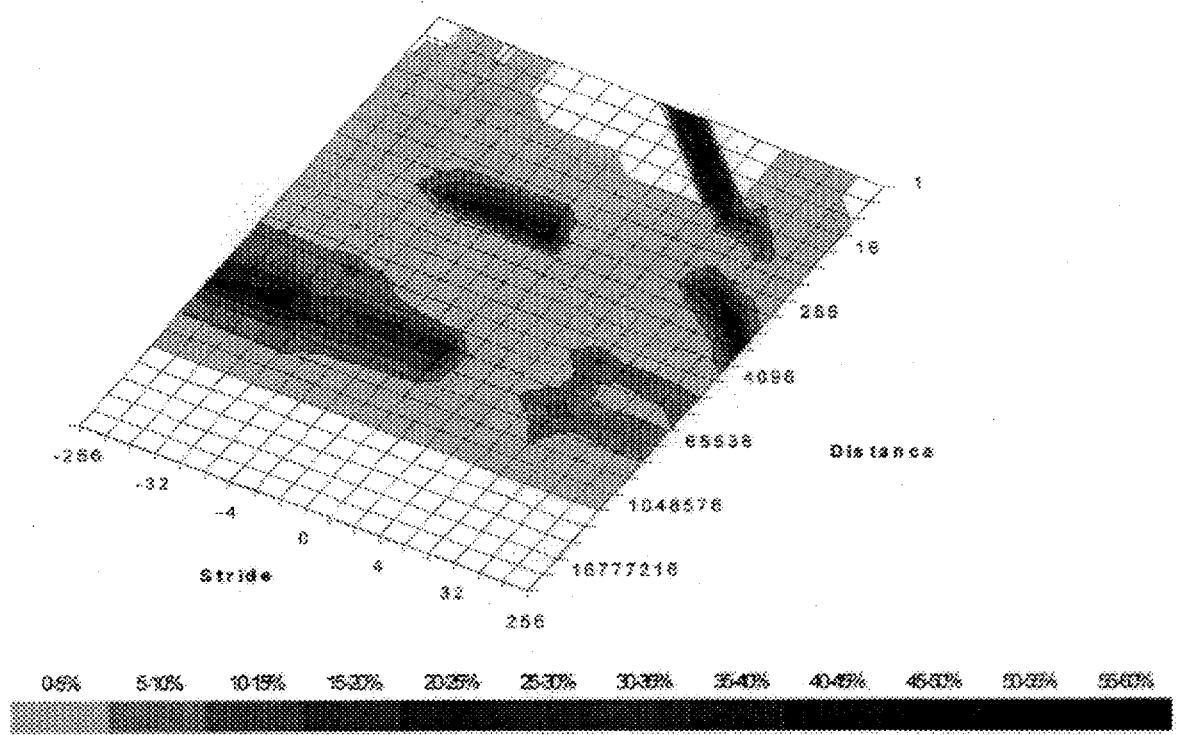
Figure 14A:
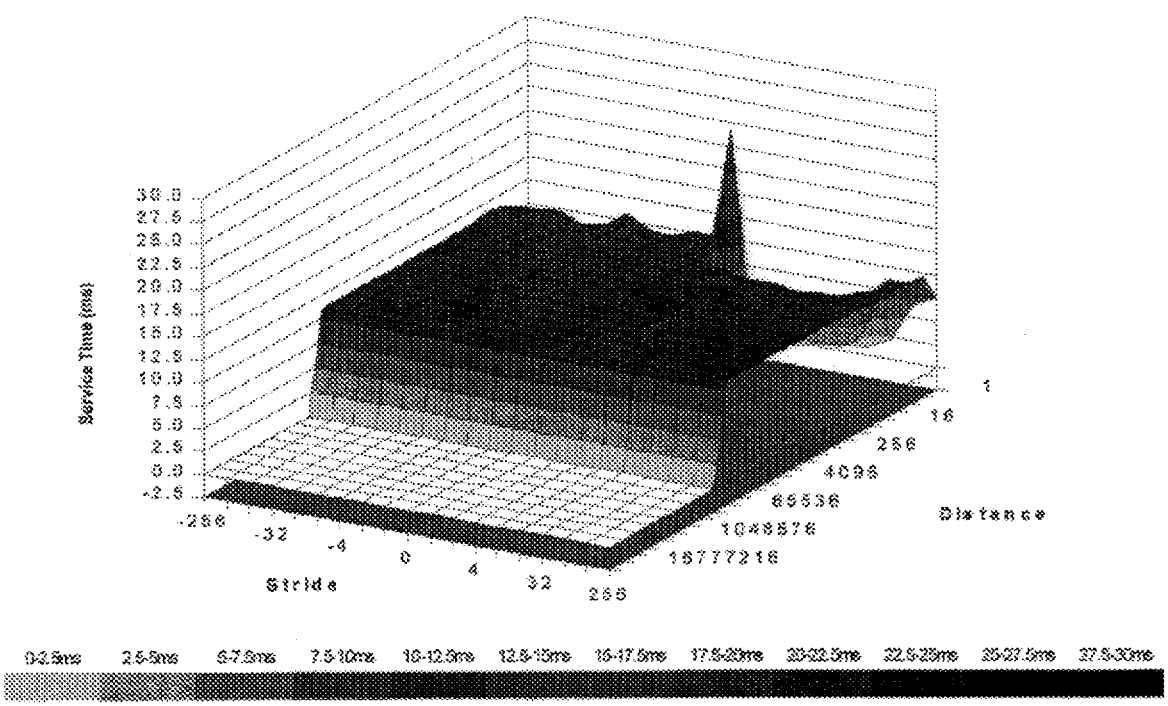
FIGS. 14a–14b and 15a–15b illustrate two exemplary response surface characteristic profiles.
Figure 14B:
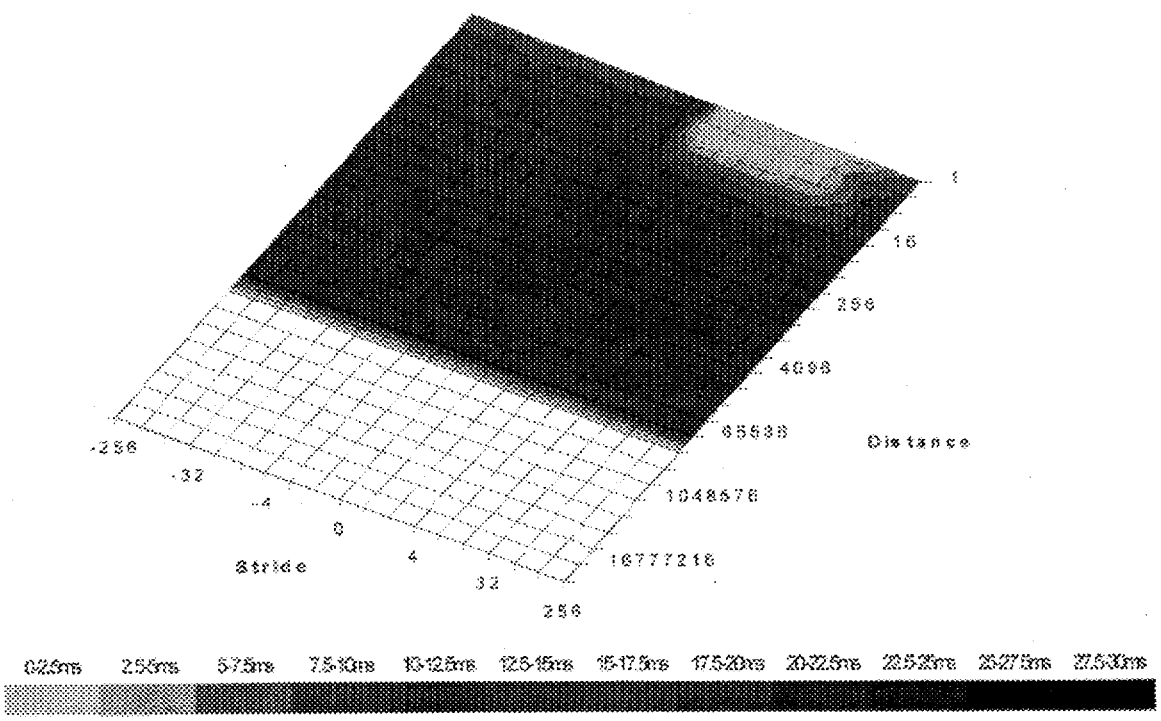
Figure 15A:
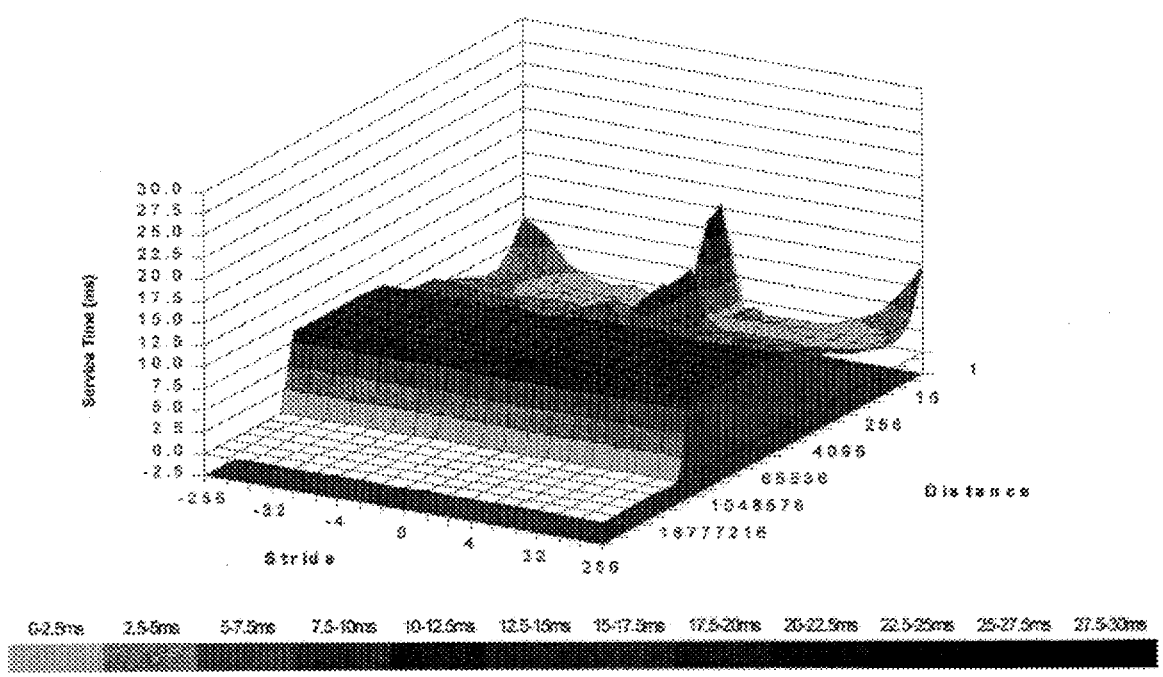
Figure 15B:
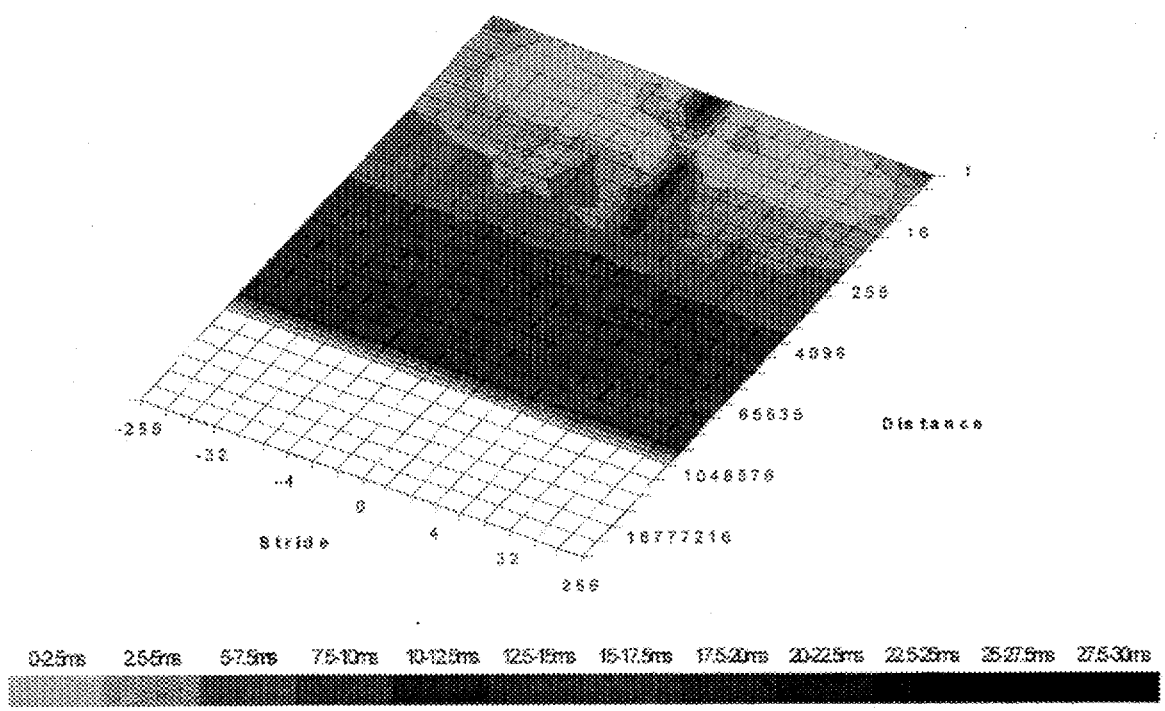

Referring briefly back to FIG. 2, as shown, the generated locality as well as the response surface characteristic data 58 and 60 are provided to conventional plotter 70 for generating the desired locality and response surface characteristic profiles 72a–72b. FIGS. 12a–12b illustrate a perspective view and a top view of a first exemplary locality characteristic profile 72a, and FIGS. 13a–13b illustrate a perspective view and a top view of a second exemplary locality characteristic profile 72a. FIGS. 14a–14b illustrate a perspective view and a top view of a first exemplary response surface characteristic profile 72b, and FIGS. 15a–15b illustrate a perspective view and a top view of a second exemplary response surface characteristic profile 72b. FIGS. 12a–12b may be used in conjunction with either FIGS. 14a–14b or FIGS. 15a–15b to analyze the interactions of the represented workload with the two represented locality dependent subsystems. Similarly, FIGS. 13a–13b may be used in conjunction with either FIGS. 14a–14b or FIGS. 15a–15b to analyze the interactions of the represented workload with the two represented locality dependent subsystems.

In one embodiment, analysis of the interaction between a workload and a locality dependent subsystem is conducted by visually examining the response surface characteristic profile for the region(s) of (d,s) values where the locality characteristic profile denotes a high propensity for activities.

Figure 16:
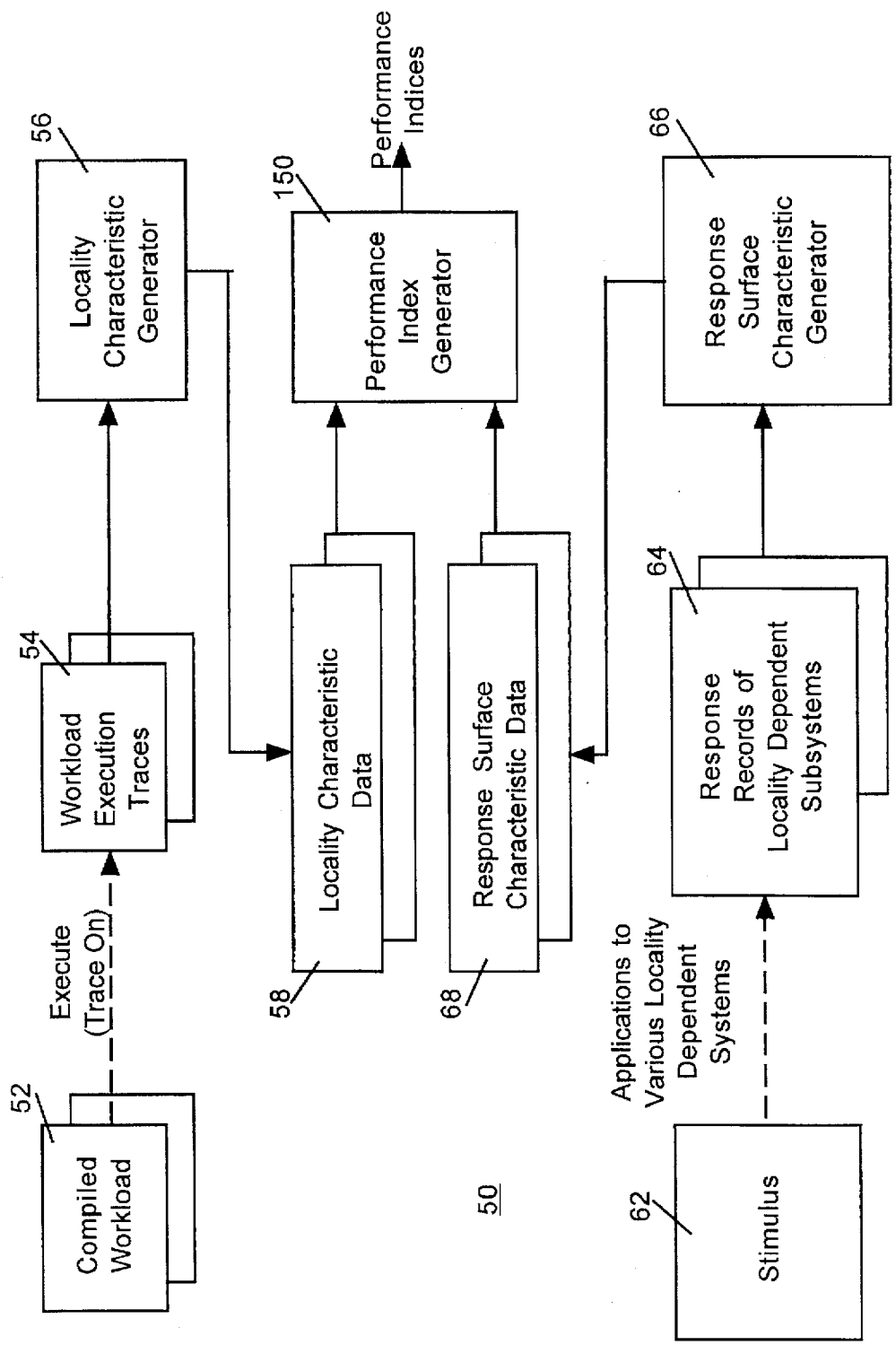
FIG. 16 illustrates an alternate embodiment of the present invention.

FIG. 16 illustrates an alternate embodiment of the present invention. As shown, instead of being provided to a conventional plotter, locality characteristic data 58 and response surface characteristic data 68 are provided to a performance index generator 150. Performance index generator 150 in turn generates expected performance indices for various combinations of workloads and locality dependent subsystems. For the illustrated embodiment, performance index generator 150 generates the performance indices using a "weighted" approach. In other words, for each combination of workload and locality dependent subsystems, performance index generator 150 generates a performance index by summing the weighted response times (probability x response time) of the various (d,s) values.

Thus, a method and apparatus for analyzing interactions between workloads and locality dependent subsystems has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system comprising operating logic that generates response characteristic data for a locality dependent subsystem from records of response times to stimuli applied to the locality dependent subsystem, the response time records include address information about target addresses against which the stimuli were applied and corresponding response times to the applied stimuli, and the generated response characteristic data include average response times for various combinations of reference distance values (d) and stride size values (s).

2. The computer system as set forth in claim 1, wherein the operating logic includes logic that systematically selects the applied stimuli as reference applied stimuli, one applied stimulus at a time, computes the d and s values for selected ones of subsequently applied stimuli after the reference applied stimulus, and correspondingly associates the response times of the selected subsequently applied stimuli with the computed d and s values.

3. The computer system as set forth in claim 2, wherein the logic that computes the d and s values, computes the d and s values for a subsequently applied stimulus if the subsequently applied stimulus is the first subsequently applied stimulus to the target address.

4. The computer system as set forth in claim 2, wherein the operating logic further includes logic that systematically selects a plurality of ranges of d values.

5. The computer system as set forth in claim 4, wherein the logic that selects the ranges of d values, systematically selects the ranges of d values by incrementally selecting non-overlapping ranges of d/2 to d values until all d values are covered by the selected ranges.

6. The computer system as set forth in claim 4, wherein the logic that selects the ranges of d values, further computes the average response times for each s value for all (d,s) value pairs where the d values are within the selected range of d values.

7. The computer system as set forth in claim 4, wherein the logic that selects the ranges of d values, further computes the average response times for each $\log_2 s$ value for all (d,s) values are within the selected range of d values.

8. The computer system as set forth in claim 1, wherein the operating logic also plots a response surface characteristic profile for the locality dependent subsystem, using the generated response characteristic data.

9. The computer system as set forth in claim 1, wherein the operating logic also generates locality characteristic data for a workload from trace records of an exemplary execution of the workload, the trace records include address information about locations accessed by the workload during the exemplary execution, and the generated locality characteristic data include frequencies of occurrences for various combinations of reference distance values (d) and stride size values (s).

10. The computer system as set forth in claim 9, wherein the operating logic further includes logic that systematically selects the accesses as reference accesses, one access at a time, and computes the d and s values for selected ones of subsequent accesses made after the reference access, if the subsequent access is the first subsequent access made to the target address.

11. The computer system as set forth in claim 10, wherein the logic that selects the reference accesses, further includes logic that systematically selects a plurality of ranges of d values, by incrementally selecting non-overlapping ranges of d/2 to d values until all d values are covered by the selected ranges.

12. The computer system as set forth in claim 11, wherein the operating logic further computes the frequencies of occurrences for each s value for all (d,s) value pairs where the d values are within the selected range of d values.

13. The computer system as set forth in claim 11, wherein the operating logic further computes the frequencies of occurrences for each $\log_2 s$ value for all (d,s) value pairs where the d values are within the selected range of d values.

14. The computer system as set forth in claim 9, wherein the operating logic further plots a response surface characteristic profile for the locality dependent subsystem, using the generated response characteristic data, and a locality characteristic profile for the workload, using the generated locality characteristic data.

15. The computer system as set forth in claim 9, wherein the operating logic also generates a plurality of performance indices using the generated response characteristic data and the generated locality characteristic data.

16. The computer system as set forth in claim 15, wherein the logic that generates the performance indices, generates the performance indices using a weighted approach.

17. A storage medium having first logic stored therein, wherein the first logic stored are to be loaded into a computer system for execution, and when executed, and provided with collected records of response times to stimuli applied to a locality dependent subsystem during execution, the first logic generates response characteristic data for the locality dependent subsystem including average response times for various combinations of reference distance values (d) and stride size values (s), the response time records including address information about target addresses against which the stimuli were applied and corresponding response times to the applied stimuli.

18. The storage medium as set forth in claim 17, wherein the first logic includes second logic for systematically selecting the applied stimuli as reference applied stimuli, one applied stimulus at a time, computes the d and s values for selected ones of subsequently applied stimuli after the reference applied stimulus, and correspondingly associates the response times of the selected subsequently applied stimuli with the computed d and s values.

19. The storage medium as set forth in claim 18, wherein the second logic computes the d and s values for a subsequently applied stimulus if the subsequently applied stimulus is the first subsequently applied stimulus to the target address.

20. The storage medium as set forth in claim 18, wherein the first logic further includes third logic for systematically selecting a range of d values.

21. The storage medium as set forth in claim 20, wherein the third logic systematically selects non-overlapping ranges of d/2 to d values (rd) until all d values are covered by one of the non-overlapping rd.

22. The storage medium as set forth in claim 21, wherein the third logic further computes the average response times for each s value for all (d,s) value pairs where the d values are within the selected range of d values.

23. The storage medium as set forth in claim 21, wherein the third logic further computes the average response times for each $\log_2 s$ value for all (d,s) value pairs where the d values are within the selected range of d values.

24. The storage medium as set forth in claim 17, wherein the storage medium further comprises second logic to be loaded into a computer system for execution, and when executed, and provided with trace records of an exemplary execution of a workload, the second logic generates locality characteristic data for the workload including frequencies of occurrences for various combinations of reference distance values (d) and stride size values (s), the trace records include address information about locations accessed by the workload during the exemplary execution.

25. The storage medium as set forth in claim 24, wherein the second logic includes third logic for systematically selecting the accesses as reference accesses, one access at a time, and computes the d and s values for selected ones of subsequent accesses made after the reference access, if the subsequent access is the first subsequent access made to the target address.

26. The storage medium as set forth in claim 25, wherein the second logic further includes fourth logic for systematically selecting a plurality of range of d values by incrementally selecting non-overlapping ranges of d/2 to d values (rd) until all d values are covered by one of the non-overlapping rd.

27. The storage medium as set forth in claim 26, wherein the fourth logic further computes the frequencies of occurrences for each s value for all (d,s) value pairs where the d values are within the selected range of d values.

28. The storage medium as set forth in claim 26, wherein the fourth logic further computes the frequencies of occurrences for each $\log_2 s$ value for all (d,s) value pairs where the d values are within the selected range of d values.

29. In one or more computer systems, a method for operating therein to generate at least a response surface characteristic profile for a locality dependent subsystem, the method comprising the steps of:
 i) applying stimuli to the locality dependent subsystem;
 ii) collecting records of response times to applied stimuli, the response time records including address information about target addresses against which the stimuli were applied and corresponding response times to the applied stimuli;
 iii) generates average response times for a plurality of combinations of reference distance values (d) and stride values (s); and
 iv) plotting the response surface characteristic profile for the locality dependent subsystem, using the generated response characteristic data.

30. The method as set forth in claim 29, wherein step (iii) comprises systematically selecting the applied stimuli as reference applied stimuli, one applied stimulus at a time, computes the d and s values for selected ones of subsequently applied stimuli after the reference applied stimulus, and correspondingly associates the response times of the selected subsequently applied stimuli with the computed d and s values.

31. The method as set forth in claim 30, wherein the computation of the d and s values for a subsequently applied stimulus in step (iii) is performed if the subsequently applied stimulus is the first subsequently applied stimulus to the target address.

32. The method as set forth in claim 30, wherein step (iii) further includes systematically selecting a plurality of ranges of d values.

33. The method as set forth in claim 32, wherein the systematic selection of ranges in step (iii) is performed by incrementally selecting non-overlapping ranges of d/2 to d values (rd) until all d values are covered by one of the non-overlapping rd.

34. The method as set forth in claim 32, wherein step (iii) further comprises computing the average response times for each s value for all (d,s) value pairs where the d values are within the selected range of d values.

35. The method as set forth in claim 32, wherein step (iii) further comprises computing the average response times for each $\log_2 s$ value for all (d,s) value pairs where the d values are within the selected range of d values.

36. The method as set forth in claim 29, wherein the method is further for generating a locality characteristic profile for a workload, the method further comprises the steps of:
 v) executing the workload representatively;
 vi) collecting trace records during the representative execution, the trace record including address information about locations accessed by the workload during the exemplary execution;
 vii) generating locality characteristic data for the workload using the collected trace records, including frequencies of occurrences for various combinations of reference distance values (d) and stride size values (s); and
 viii) plotting the locality characteristic profile for the workload, using the generated locality characteristic data.

37. The method as set forth in claim 36, wherein step (vii) includes systematically selecting the accesses as reference accesses, one access at a time, and computing the d and s values for selected ones of subsequent accesses made after the reference access, if the subsequent access is the first subsequent access made to the target address.

38. The method as set forth in claim 37, wherein step (vii) further includes systematically selecting a plurality of ranges of d values, by incrementally selecting non-overlapping ranges of d/2 to d values until all d values are covered by the selected ranges.

39. The method as set forth in claim 38, wherein step (vii) further computes the frequencies of occurrences for each s value for all (d,s) value pairs where the d values are within the selected range of d values.

40. The method as set forth in claim 38, wherein step (vii) further computes the frequencies of occurrences for each $\log_2 s$ value for all (d,s) value pairs where the d values are within the selected range of d values.

* * * * *